United States Patent
Kyrazis

(10) Patent No.: US 10,294,919 B2
(45) Date of Patent: May 21, 2019

(54) PREDICTIVE BLADE ADJUSTMENT

(71) Applicant: Demos T. Kyrazis, Albuquerque, NM (US)

(72) Inventor: Demos T. Kyrazis, Albuquerque, NM (US)

( * ) Notice: Subject to any disclaimer, the term of this patent is extended or adjusted under 35 U.S.C. 154(b) by 217 days.

(21) Appl. No.: 14/330,759

(22) Filed: Jul. 14, 2014

(65) Prior Publication Data

US 2015/0308407 A1 Oct. 29, 2015
US 2019/0063403 A9 Feb. 28, 2019

Related U.S. Application Data

(63) Continuation-in-part of application No. 14/262,215, filed on Apr. 25, 2014, now abandoned.

(60) Provisional application No. 61/816,027, filed on Apr. 25, 2013.

(51) Int. Cl.
| | |
|---|---|
| *F03D 7/02* | (2006.01) |
| *F03D 17/00* | (2016.01) |
| *B64C 11/30* | (2006.01) |
| *F03D 7/04* | (2006.01) |
| *B64C 27/57* | (2006.01) |

(52) U.S. Cl.
CPC ............ *F03D 7/0224* (2013.01); *B64C 11/30* (2013.01); *F03D 7/043* (2013.01); *F03D 17/00* (2016.05); *B64C 27/57* (2013.01); *F05B 2270/32* (2013.01); *F05B 2270/8042* (2013.01); *Y02E 10/723* (2013.01)

(58) Field of Classification Search
CPC .............................. F03D 7/0228; F03D 7/0256
See application file for complete search history.

(56) References Cited

U.S. PATENT DOCUMENTS

| | | |
|---|---|---|
| 3,611,367 A | 10/1971 | Billottet et al. |
| 4,589,070 A | 5/1986 | Kyrazis |
| 4,595,287 A | 6/1986 | Edlin |
| 4,875,770 A | 10/1989 | Rogers et al. |
| 4,935,775 A | 6/1990 | Wissman et al. |
| 4,995,720 A | 2/1991 | Amzajerdian |
| 4,998,225 A | 3/1991 | Shajenko |
| 5,069,545 A | 12/1991 | Hinz |
| 5,088,808 A | 2/1992 | O'Meara |
| 5,088,815 A | 2/1992 | Garnier et al. |
| 5,164,784 A | 11/1992 | Waggoner |

(Continued)

OTHER PUBLICATIONS

Elley, Neil D, "Boundary Layer Turbulence and Turbine Interactions with a Historical Perspective", AMS Short Course: Wind Energy Applications, Supported by Atmospheric Boundary Layer Theory, Observations, and Modeling; National Wind Technology Center; Keystone, Colorado, Aug. 1, 2010.

*Primary Examiner* — Jason D Shanske
*Assistant Examiner* — John S Hunter, Jr.
(74) *Attorney, Agent, or Firm* — Justin R. Jackson; Deborah A. Peacock; Peacock Law P.C.

(57) ABSTRACT

Predictively adjusting the pitch of blades and/or sections of a blade based on fluid velocity measurements. In one embodiment, the measurements are obtained of an upstream portion of a fluid flow using a laser Doppler velocimeter. The pitch of the blade(s) and/or blade section(s) are then adjusted to achieve a desired amount of lift or to create a stall-configuration as can be useful for conditions in which an excessive fluid velocity is detected.

17 Claims, 2 Drawing Sheets

(56) References Cited

U.S. PATENT DOCUMENTS

| | | |
|---|---|---|
| 5,276,453 A | 1/1994 | Heymsfield |
| 5,317,376 A | 5/1994 | Amzajerdian et al. |
| 5,502,558 A | 3/1996 | Menders et al. |
| 5,552,879 A | 9/1996 | Takamiya et al. |
| 5,587,785 A | 12/1996 | Kato et al. |
| 5,610,705 A | 3/1997 | Brosnan et al. |
| 5,621,514 A | 5/1997 | Paranto et al. |
| 5,724,125 A | 3/1998 | Ames |
| 5,748,295 A | 5/1998 | Farmer |
| 5,774,218 A | 6/1998 | Takamiya et al. |
| 5,796,471 A | 8/1998 | Wilkerson et al. |
| 5,815,250 A | 9/1998 | Thomson et al. |
| 5,831,720 A | 11/1998 | Ishida et al. |
| 5,838,439 A | 11/1998 | Zang et al. |
| 5,923,459 A | 7/1999 | Filipov et al. |
| 6,078,384 A | 6/2000 | Dammann et al. |
| 6,100,965 A | 8/2000 | Nerin |
| 6,133,993 A | 10/2000 | Labaar |
| 6,170,795 B1 | 1/2001 | Wayne |
| 6,181,412 B1 | 1/2001 | Popescu et al. |
| 6,188,469 B1 | 2/2001 | Liou et al. |
| 6,301,968 B1 | 10/2001 | Maruyama et al. |
| 6,388,739 B1 | 5/2002 | Rice |
| 6,396,577 B1 | 5/2002 | Ramstack |
| 6,434,176 B1 | 8/2002 | Deck |
| 6,469,778 B2 | 10/2002 | Asaka et al. |
| 6,477,189 B1 | 11/2002 | Takeda et al. |
| 7,777,866 B1 * | 8/2010 | Kyrazis .................. G01P 3/366 356/28.5 |
| 7,950,901 B2 * | 5/2011 | Barbu ..................... F03D 1/008 415/1 |
| 8,029,233 B2 * | 10/2011 | Hoffmann ............... F03D 17/00 415/118 |
| 8,622,698 B2 * | 1/2014 | Kristoffersen ........ F03D 7/0224 290/44 |
| 2001/0009458 A1 | 7/2001 | Asaka et al. |
| 2002/0071109 A1 | 6/2002 | Allen |
| 2009/0047116 A1 | 2/2009 | Barbu et al. |
| 2011/0142622 A1 | 6/2011 | Hoffmann |
| 2012/0128488 A1 * | 5/2012 | Kristoffersen ........ F03D 7/0224 416/31 |
| 2012/0321462 A1 * | 12/2012 | McPherson ........... F03D 1/0675 416/1 |

\* cited by examiner

PREDICTIVE BLADE ADJUSTMENT

CROSS-REFERENCE TO RELATED APPLICATIONS

This application is a continuation-in-part patent application of U.S. patent application Ser. No. 14/262,215, entitled "Predictive Blade Adjustment", filed on Apr. 25, 2014, which itself claims priority to and the benefit of the filing of U.S. Provisional Patent Application Ser. No. 61/816,027, entitled "Maximizing the Extraction of Wind Energy Through the Use of Predictive Adaption of Wind Turbine Blades", filed on Apr. 25, 2013, and the specification and claims thereof are incorporated herein by reference.

STATEMENT REGARDING FEDERALLY SPONSORED RESEARCH OR DEVELOPMENT

Not Applicable.

BACKGROUND OF THE INVENTION

Field of the Invention (Technical Field)

Embodiments of the present invention relate to a method and system for predictively determining an optimum blade pitch based on approaching fluid velocities.

Description of Related Art

Historically, props of turbines, airplanes, and the like, have a pitch and/or pattern of pitches set at a predetermined amount. This predetermined pitch and/or pattern of pitches typically manifests itself as an integral incorporation in the blade design at the time that it is manufactured. Alternatively, some blades can be user-adjusted within a predetermined range such that a blade can be user-adjusted to a desired pitch for a given application.

Such predetermined pitch blades, however, are not typically configured for on-the-fly pitch adjustments. Rather, they often require a user to stop the blade and then perform some adjustment manipulation to the blade. Some blades, however, are and/or can be adjusted on-the-fly. These include large wind turbine blades. Although adjustable pitch blades are known, their use in making on-the-fly adjustments have been severely restricted in many applications—so much so that their adjustments have been used merely as a reaction to fluid velocity alterations already experienced by the blades. For example, on large turbines, the blades are often made to rotate to a desired pitch once when the turbine begins to experience wind velocities that meet predetermined thresholds—such as those which would cause excessive speeds.

The problem with using adjustable pitch blades in a mere reactionary manner is that a lot of the benefit of the on-the-fly adjustment ability is negated because such blades are forced to endure the unwanted fluid velocity, at least initially, before their pitch is adjusted.

Because wind velocities are different at different altitudes, and because large turbines span many vertical feet, the blades of a wind turbine encounter different wind velocities as they rotate. In fact, because a single blade of large turbines can easily exceed 200 feet in length, a single blade can encounter different wind velocities simultaneously at various points along its length over an altitude range exceeding 400 feet. These differing wind velocities result in differing angles of attack and dynamic pressures at different points along the blade's length, thus causes flexing of the blade as it rotates from the top position to the bottom position. Because of this, such blades are often operated in a stall configure to avoid flexing. Although operating blades in a stall configuration thus prolongs blade life, it is highly inefficient because a large fraction of the available wind energy is used simply to turn the blade instead of being available to turn the turbine generator. The ability to scan incoming air masses in front of a turbine blade and then independently adjust the pitch of the blade along multiple segments thereof would thus permit the blade to be ran at much more efficient angles of attack while still prolonging blade life.

There is thus a present need for an invention which permits the adjustment of blades predictively such that the pitch of the blades is adjusted by utilizing the advantages of a feed forward control system and not merely as a post-facto reflex.

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

BRIEF SUMMARY OF EMBODIMENTS OF THE PRESENT INVENTION

An embodiment of the present invention relates to an automated system for achieving a desired amount of lift in a blade which includes providing a pitch-adjustable blade, providing a laser Doppler velocimeter, measuring a velocity of an up-stream fluid, and adjusting the pitch of the blade to achieve a desired amount of lift based on the measured up-stream fluid velocity.

Measuring a velocity can include measuring a plurality of points in the up-stream fluid, which can further include taking multiple measurements while scanning an area of the up-stream fluid, which act of scanning can include repeatedly and/or continuously scanning to monitor the up-stream fluid.

Optionally, the pitch-adjustable blade can include a blade of a wind turbine and the laser Doppler velocimeter can be disposed on a nacelle of the wind turbine. In one embodiment, the pitch-adjustable blade, which as previously-indicated can be a blade of a wind turbine, can be formed into a plurality of sections which are pitch-adjustable. The plurality of sections of the pitch-adjustable blade can be adjusted to maintain a constant lift distribution so that little or no oscillatory bending of the pitch-adjustable blade occurs. In one embodiment, tip-vortex reduction end plates can be disposed between at least some of the plurality of sections. Adjusting the pitch of the blade can include adjusting the pitch of the blade so that the blade is adjusted into a position such that substantially no lift is provided in a wind condition exceeding a predetermined amount. Adjusting the pitch of the blade can include adjusting the pitch of the blade so that a maximum amount of lift is achieved for the measured velocity of the up-stream fluid. Optionally, the velocity of the up-stream fluid can be measured a sufficient distance in front of the blade so the pitch of the blade can be adjusted before the measured up-stream fluid encounters the blade. The fluid can include air and/or water. A magnitude and direction of the adjustment of the pitch of the blade can be determined by a microprocessor and/or a microcontroller.

In one embodiment, the laser Doppler velocimeter can include a three-dimensional laser Doppler velocimeter. The three-dimensional laser Doppler velocimeter can include two or three detectors arranged in a triangular configuration. In one embodiment, a breaking mechanism can be activated when the measured velocity of the up-stream fluid exceeds a predetermined amount. Optionally, an absolute rotary encoder and/or an incremental rotary encoder can be communicably coupled to the blade.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The term "blade" as used throughout this application is intended to include any type of propeller, blade, turbine, wing, and the like which is capable of interacting with a fluid to create lift, perform work, or to move the fluid. The term "pitch" as used throughout this application is defined as the angle made by the airfoil chord line with the axis of rotation of the blade. Note that, in general, the pitch angle is a function of radius and increases as the radius increases. The "angle of attack" is defined as the angle that the chord line makes with the relative wind and/or other fluid in which the blade is operated. The relative wind and/or fluid at a given radius consists of the vector addition of the wind vector components along the axis of rotation and the negative tangential velocity vector.

In one embodiment, a laser Doppler velocimeter, such as that described in U.S. Pat. No. 7,777,866 is preferably configured to look ahead of a blade a predetermined amount of time or distance—for example about 2 to about 15 seconds and more preferably about 3 to about 10 seconds. In this embodiment, the velocimeter preferably looks ahead into an incoming (i.e. up-stream) fluid flow and scans multiple flow velocities in that incoming fluid flow. Using those measured velocities, a two-dimensional map of oncoming fluid velocities can be created. Using the known velocity and distance to that measured point in the fluid, a blade, or segment thereof can be adjusted such that its angle of attack when encountering that portion of the fluid flow meets a predetermined requirement.

Figure 2:
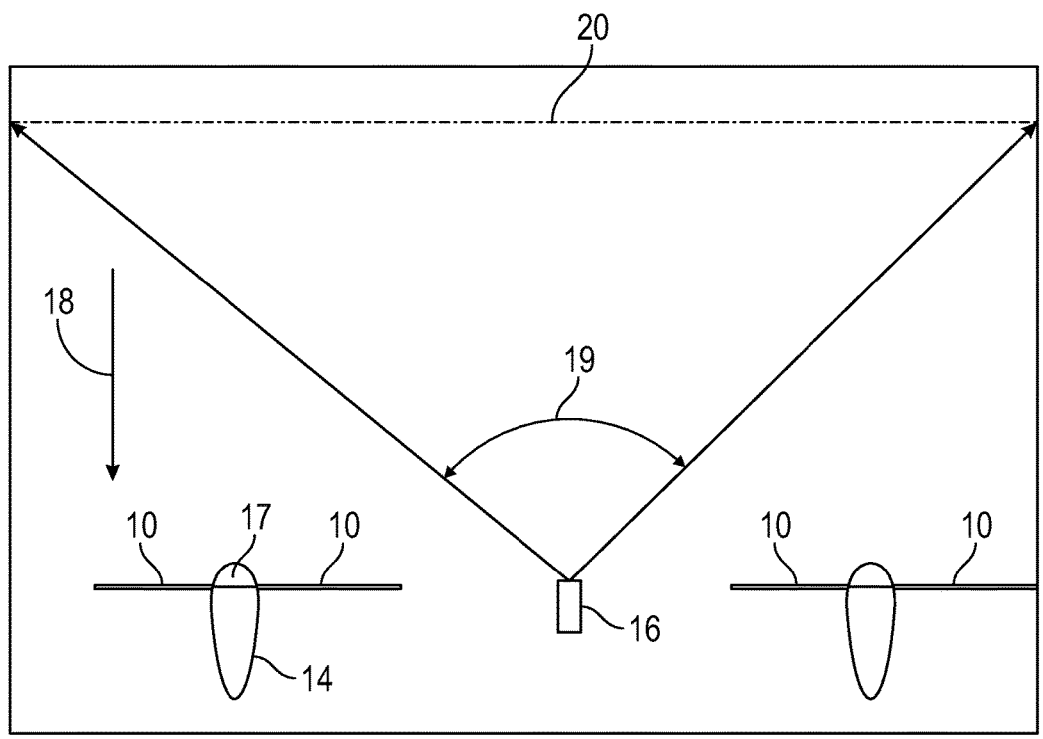
FIG. 2 is a drawing which illustrates an embodiment of the present invention wherein a single laser velocimeter is used to monitor up-stream air for a plurality of turbines.

In one embodiment, by utilizing the above mentioned laser Doppler velocimeter, the three dimensional velocity vector at a point in space can be measured. For example, three detector systems can be mounted at the vertices of an equilateral triangle, and focused on the laser beam at a distance of 280 feet upwind. The whole assembly of laser and detectors can sweep vertically in an arc of about 45° above and below the horizon, or another angle selected by the user most preferably in a direction facing an average wind direction 18, and/or in a horizontal laser scanning arc 19 as best illustrated in FIG. 2. This would give a minimum of a 3 second warning for a 400 ft. diameter wind turbine for a 56 mph wind. Note that this would be the cutoff velocity for operation of a large wind turbine. The very low cost of the above-mentioned Doppler laser system allows a user to provide one for each wind turbine. The detector can optionally be mounted on a tower of the turbine or on nacelle 14 (see FIG. 2). Thus, the downwind turbines are able to measure wakes in coordinate plane 20 of the upwind turbines, and optimize blades 10, which can be attached to hub 17, accordingly.

Figure 1:
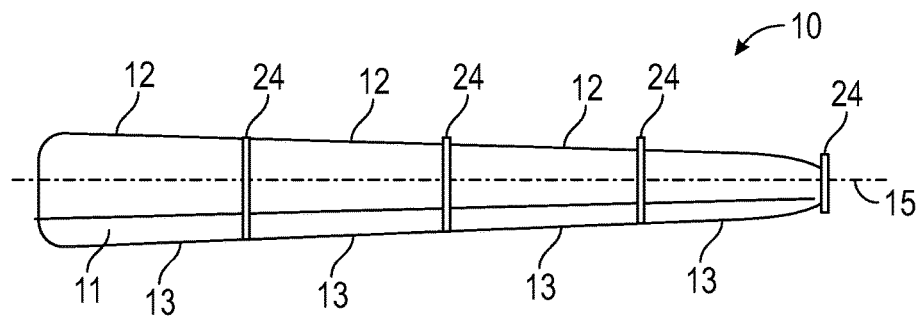
FIG. 1 is a drawing which illustrates an embodiment of the present invention wherein a blade comprises a plurality of independently-movable segments.

In one embodiment, a large blade, such as that of a large turbine, is preferably configured into multiple segments, each of which is preferably configured to independently rotate at least partially with respect to the other segments. FIG. 1 illustrates blade 10 having multiple segments 12, each of those segments is preferably capable of independently adjusting to different pitches. In this embodiment, the segments can be adjusted via an electrical or hydraulic motor and each segment preferably also has an absolute or an incremental rotary encoder or some other method, system, or apparatus by which the measure of rotation and/or the resulting pitch of that section is known. In one embodiment, a position sensor or another sensor or group thereof (such as an absolute or an incremental rotary encoder) is preferably used to determine the position of the blade as a whole with respect to its position and/or orientation above the ground surface. In one embodiment, a microcontroller, microprocessor, or the like is preferably employed such that the position sensors of each of the segments is continuously read and such that each segment's spatial position is known and such that one or more velocity readings from the upcoming fluid stream are obtained from velocimeter 16 (see FIG. 2).

The microcontroller then preferably determines the upcoming fluid velocity intersecting each segment of blade 10 and then initiates a pitch adjustment for that segment such that the blade intersects the upcoming fluid stream at a desired angle of attack. In one embodiment, for example, the microcontroller can calculate the velocity of each segment and then adjust that segment such that a maximum amount of lift is generated if the segment is not traveling at a speed in excess of a predetermined maximum amount.

Although a blade can be partitioned into any desired number of segments, in one embodiment, each segment is preferably from about 50 feet in length, to about 5 feet in length and more preferably about 30 feet in length to about 10 feet in length.

As best illustrated in FIG. 1, one or more segments 12 can be adjusted by manipulating a corresponding trim tab 13 attached thereto, and which are preferably arranged along hinge line 11. In this manner, a small force is all that is needed in order to effect the movement of the corresponding segment. A preferred location of pitch and segment rotation axis 15 is illustrated in FIG. 1.

In one embodiment, the angle of attack for each segment can be adjusted to prevent excessive lift (i.e. excessive rotational speed for a turbine). For example, in one embodiment the angle of attack of one or more blade segments can be adjusted to a low angle of attack such that little or no lift is produced—for example an angle of attack of between about 6° to an angle of attack of about −4° and more preferably an angle of attack of about +4°.

By constructing each blade in multiple segments, the ease of shipping large blades is thus made much simpler. In addition, on site repairs of damaged blades can be made more economically since only the damaged section needs to be replaced.

Figure 3:
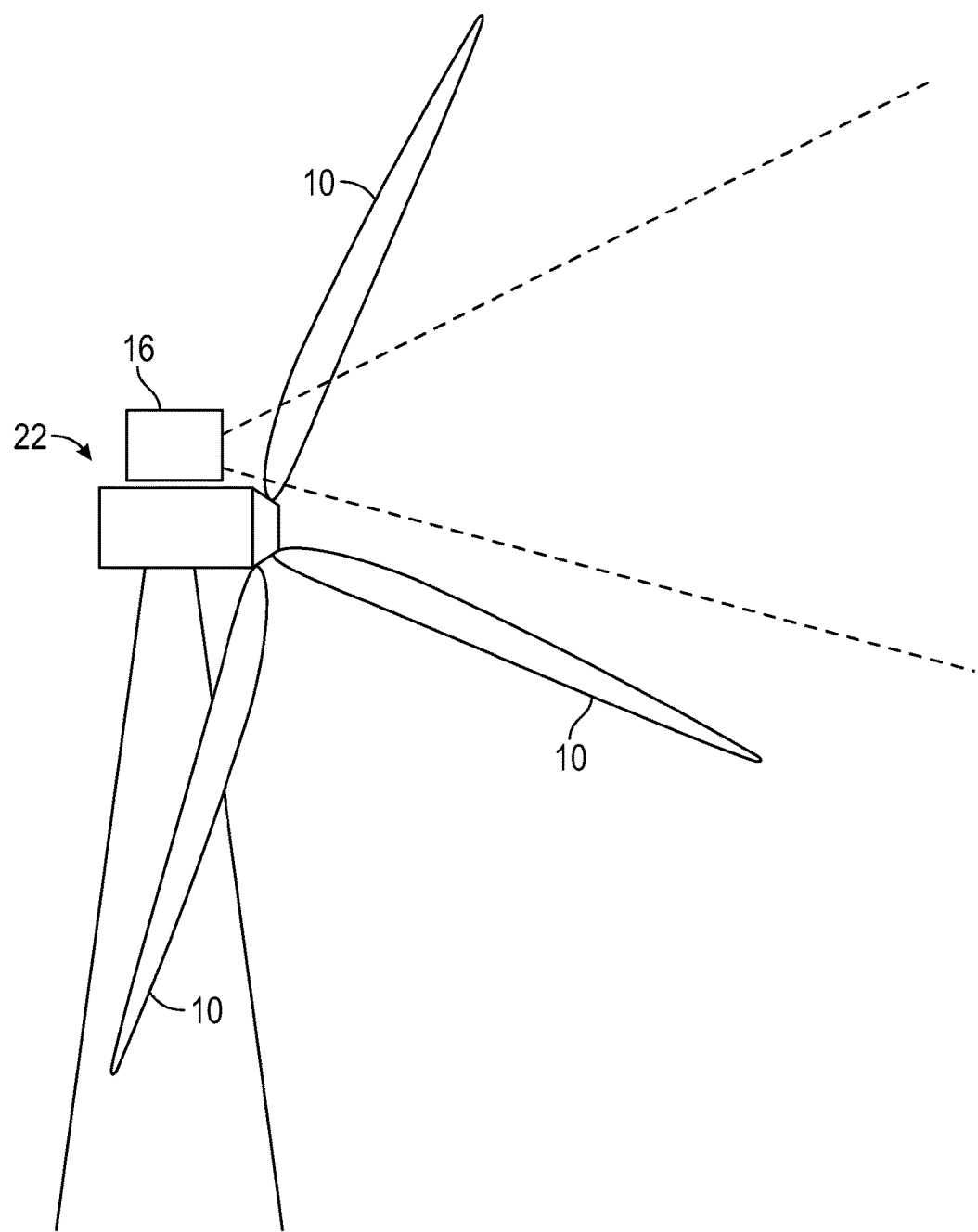
FIG. 3 is a drawing which illustrates an embodiment of the present invention wherein a laser velocimeter is positioned to monitor up-stream air flow for a single turbine.

In one embodiment, blades 10 not formed into segments, but which do have a single pitch adjustment mechanism for the entire blade can be predictively adjusted on-the-fly in order to maximize lift, or otherwise respond to some upcoming stream velocity that has been obtained with velocimeter 16. For example, as best illustrated in FIG. 3, a large turbine, such as turbine 22 as is typically in use today can be retro-fitted with velocimeter 16 and its single blade pitch adjustment can be modified such that each of blades 10 intersect an upcoming fluid flow at a predetermined angle of attack. For example, an additional general purpose computer, comprising a processor operating in accordance with software instructions stored in a non-transitory storage medium, which converts the general purpose computer into a special purpose and which special purpose computer provides the ability to predictively adjust each of blades 10 of turbine 22 in order to maximize the efficiency of the turbine and to predictively prevent each of blades 10 from encountering incoming wind at an angle of attack that would cause an excessive speed of turbine 22 or which would cause excessive flexing of one or more of blades 10.

In one embodiment, the Doppler laser velocimeter can be attached to aircraft to detect upcoming microbursts and avoid disasters. In another embodiment, the Doppler can be attached to the underside of an aircraft to scan and obtain when velocities at different points to the ground thereby enabling it more accurate dropping of munitions and or parachuted items.

In one embodiment, the present invention can maintain a constant lift distribution so that little or no oscillatory bending of the blade occurs. Tip vortices can be greatly reduced by the application of one or more end plates 24 (see FIG. 1) that can be disposed at the terminal end of the blade and which can optionally be disposed between each section of a segmented blade. The reduction of tip vortices results in a less turbulent flow of fluid for other blades that are down-stream. For example, for a wind farm, reducing the tip vortices of the front turbines creates a less turbulent air flow for subsequent turbines, thus reducing the stresses that those subsequent turbines would otherwise experience.

In embodiments wherein a segmented blade is provided, although the ability to individually manipulate individual segments greatly improves lift distribution and thus results in less-frequent blade failures, in the event that such a blade does fracture, only the segment wherein the fracture occurs need be replaced, thus greatly reducing the repair costs for such an event. Because each point of velocity measurement can be made in only a few milliseconds, a series of hundreds of measurements can be made in less than a second. By repeatedly scanning the up-stream fluid, it can continuously be monitored.

In one embodiment, blade 10 can optionally be provided with a mechanism for adjusting the lift coefficient, which can include adjusting the angle of attack. This can be done in discreet segments of blade 10 or to the entirety of blade 10. Optionally, the blade can be adjusted via blade warping. In one embodiment the blade can be adjusted by any mechanism, including but not limited to blades which can be adjusted to change their lift coefficients while not adjusting the angle of attack or the pitch of the blade. In one embodiment, for blades that can be adjusted in fluids other than air, a suitable mechanism for detecting the velocity of the upstream fluid can be used in lieu of the laser Doppler velocimeter. For example, for embodiments wherein the fluid is water, sonar can be used to determine the velocity of the upstream fluid.

Optionally, embodiments of the present invention can include a general or specific purpose computer or distributed system programmed with computer software implementing steps described above, which computer software may be in any appropriate computer language, including but not limited to C++, FORTRAN, BASIC, Java, assembly language, microcode, distributed programming languages, etc. The apparatus and/or system may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An automated system for achieving a desired amount of lift in a blade comprising:
   a pitch-adjustable blade comprising a plurality of sections that are pitch adjustable;
   a plurality of position sensors configured to monitor said plurality of sections;
   a laser doppler velocimeter configured to measure a three dimensional velocity vector at a plurality of points in space of an up-stream fluid while scanning an area of the upstream fluid; and
   a microcontroller or microprocessor configured to initiate an adjustment of a pitch of one or more sections of said pitch-adjustable blade to achieve a desired amount of lift based on the measured up-stream fluid velocity that each of said one or more sections of said pitch-adjustable blade will intersect, while preventing an angle of attack for each of said one or more sections that would result in an excessive rotational speed.

2. The automated system of claim 1 wherein said laser doppler velocimeter is configured to repeatedly scan to monitor the up-stream fluid.

3. The automated system of claim 1 wherein said pitch-adjustable blade is configured for use with a wind turbine.

4. The automated system of claim 3 wherein said laser doppler velocimeter is disposed on a nacelle of the wind turbine.

5. The automated system of claim 1 wherein tip-vortex reduction end plates are disposed between at least some of said plurality of sections.

6. The automated system of claim 1 wherein adjusting the pitch of said pitch-adjustable blade comprises adjusting the pitch of said pitch-adjustable blade so that no lift is created in a wind condition exceeding a predetermined amount.

7. The automated system of claim 1 wherein adjusting the pitch of said pitch-adjustable blade comprises adjusting the pitch of said pitch-adjustable blade so that the most lift that can be achieved by adjustments made to the pitch of said pitch-adjustable blade is achieved for the measured three dimensional velocity vector of the up-stream fluid.

8. The automated system of claim 1 wherein said laser doppler velocimeter is configured to measure a three dimensional velocity vector of the up-stream fluid at a sufficient distance in front of said pitch-adjustable blade so the pitch of said pitch-adjustable blade can be adjusted before the measured up-stream fluid encounters said pitch-adjustable blade.

9. The automated system of claim 1 wherein the fluid is air.

10. The automated system of claim 1 wherein said microcontroller or microprocessor is configured to determine a magnitude and direction of the adjustment of the pitch of said pitch-adjustable blade.

11. The automated system of claim 1 wherein said laser doppler velocimeter comprises three detectors arranged in a triangular configuration.

12. The automated system of claim 1 further comprising a braking mechanism configured to activate when the measured three dimensional velocity vector of the up-stream fluid exceeds a predetermined amount.

13. The automated system of claim 1 further comprising a set of rotary encoders that are referenced to a rotational axis about which said pitch-adjustable blade rotates.

14. An automated system for achieving a desired amount of lift in a blade comprising:
   a pitch-adjustable blade;
   a position sensor configured to monitor a position of said pitch-adjustable blade;
   a laser doppler velocimeter configured to measure a three dimensional velocity vector at a plurality of points in space of an up-stream fluid while scanning an area of the upstream fluid; and
   a microcontroller or microprocessor configured to initiate an adjustment of a pitch of said pitch-adjustable blade to achieve a desired amount of lift based on the measured up-stream fluid velocity that said pitch-adjustable blade will intersect, while preventing an angle of attack that would result in an excessive rotational speed.

15. The automated system of claim 14 wherein said pitch-adjustable blade is configured for use with a wind turbine.

16. The automated system of claim 15 wherein said laser doppler velocimeter is disposed on a nacelle of the wind turbine.

17. An automated method for extracting energy from wind by a wind turbine comprising:
   maintaining a desired lift distribution along a pitch-adjustable blade of the wind turbine as the pitch-adjustable blade rotates about an axis of the wind turbine, the pitch-adjustable blade comprising a plurality of sections that are each pitch-adjustable;
   providing rotary sensors configured to determine pitch angle for the plurality of sections of the pitch-adjustable blade;
   measuring three components of a wind vector with a laser doppler velocimeter as velocity of the wind varies over an altitude range swept out by the pitch-adjustable blade during the pitch-adjustable blade's rotation about the axis of the wind turbine;
   computing variation in a relative wind vector for each of the plurality of sections of the pitch-adjustable blade while the pitch-adjustable blade is rotating about the axis of the wind turbine; and
   obtaining a desired amount of lift for each of the plurality of sections of the pitch-adjustable blade by continually adjusting a pitch of each of the plurality of sections as the pitch-adjustable blade rotates about the axis of the wind turbine so as to achieve an angle of attack that provides the desired amount of lift.

* * * * *